United States Patent [19]
Ball et al.

[11] Patent Number: 4,962,783
[45] Date of Patent: Oct. 16, 1990

[54] BUTTERFLY VALVE APPARATUS AND METHOD

[75] Inventors: Larry K. Ball, Chandler; Marshall U. Hines, Scottsdale, both of Ariz.

[73] Assignee: Allied-Signal Inc., Morris Township, Morris County, N.J.

[21] Appl. No.: 422,380

[22] Filed: Oct. 16, 1989

[51] Int. Cl.$^5$ .............................................. F16K 1/22
[52] U.S. Cl. .................................. 137/1; 137/599.2; 137/630; 251/305
[58] Field of Search ................ 137/599.2, 630, 630.15, 137/1; 251/25, 305

[56] References Cited

U.S. PATENT DOCUMENTS

| | | |
|---|---|---|
| 212,556 | 2/1879 | Johnson . |
| 443,326 | 12/1890 | Leverich . |
| 932,172 | 8/1909 | Porter et al. . |
| 965,322 | 7/1910 | Peterson . |
| 1,167,145 | 1/1916 | Baverey . |
| 1,328,565 | 1/1920 | Howard . |
| 1,541,047 | 6/1925 | Hart . |
| 1,744,798 | 1/1930 | Price . |
| 2,051,881 | 8/1936 | Mock . |
| 2,095,263 | 4/1936 | Moss . |
| 2,271,390 | 1/1942 | Dodson . |
| 2,796,082 | 6/1957 | Green .............................. 251/25 X |
| 2,833,511 | 5/1958 | Fletcher . |
| 2,910,266 | 10/1959 | Condello et al. . |
| 3,008,685 | 11/1961 | Rudden . |
| 3,062,232 | 11/1962 | McGay . |
| 3,065,950 | 11/1962 | Goldberg . |
| 3,200,838 | 8/1965 | Sheaffer . |
| 3,298,659 | 1/1967 | Cupedo . |
| 3,344,808 | 10/1967 | Cary . |
| 3,400,907 | 9/1968 | Horn et al. . |
| 3,442,489 | 5/1969 | Cary et al. . |
| 3,516,640 | 6/1970 | Bryer et al. . |
| 3,545,486 | 12/1970 | Larson . |
| 3,675,681 | 7/1972 | Obermaier . |
| 3,677,297 | 7/1972 | Walton . |
| 3,794,288 | 2/1974 | Dolder et al. . |
| 3,960,177 | 6/1976 | Baumann . |
| 3,971,414 | 7/1976 | Illing .............................. 137/630.15 |
| 3,982,725 | 9/1976 | Clark . |
| 3,993,096 | 11/1976 | Wilson .............................. 137/599.2 |
| 4,084,617 | 4/1978 | Happe . |
| 4,190,074 | 2/1980 | Mailliet et al. . |
| 4,313,592 | 2/1982 | Baas . |
| 4,367,861 | 1/1983 | Bray et al. . |
| 4,508,132 | 4/1985 | Mayfield, Jr. et al. . |
| 4,534,538 | 8/1985 | Buckley et al. . |
| 4,556,192 | 12/1985 | Ramisch . |
| 4,586,693 | 5/1986 | Tinner . |
| 4,706,706 | 11/1987 | Page et al. . |
| 4,712,768 | 12/1987 | Herr et al. . |

FOREIGN PATENT DOCUMENTS 2821766 11/1979 Fed. Rep. of Germany .
1533073 11/1978 United Kingdom .

OTHER PUBLICATIONS

"Fishtail vs. Conventional Discs in Butterfly Valves", Carl Wilson, Instruments & Control Systems, vol. 41; Mar. 1968.

"The Note on the Reduction of the Fluid Dynamic Torque of Butterfly Valves", D. W. Bryer, National Physics Laboratory, Aerodynamics Division; Sep. 1986.

Primary Examiner—Robert G. Nilson
Attorney, Agent, or Firm—Terry L. Miller; Joseph R. Black; James W. McFarland

[57] ABSTRACT

A butterfly valve includes a duct defining a fluid flow path and a plate-like valve member pivotal in the duct to in one position open and close the latter. The valve member is pivotal to a second position spanning the duct and extending parallel to the flow path to allow fluid flow therein. Means are provided for altering the effective area distribution of the valve member about its pivot axis to effect opening and closing of the inventive valve in response to fluid pressure forces acting thereon.

19 Claims, 2 Drawing Sheets

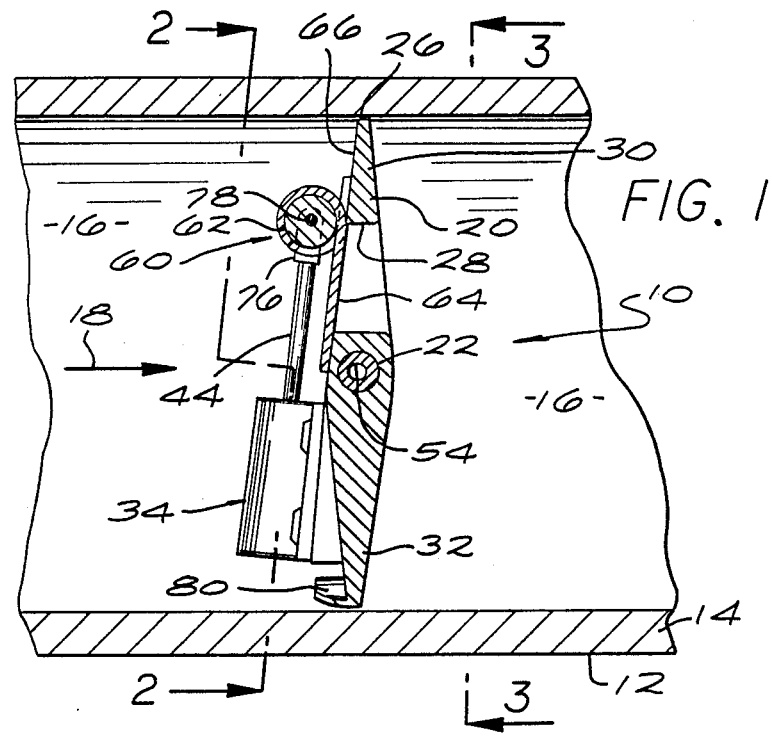

BUTTERFLY VALVE APPARATUS AND METHOD

The coinventors named on this application are also coinventors on other related applications generally relating to butterfly valves (including Serial Nos. 374,897, filed 30 Jun., 1989; 395,234, filed 17 Aug., 1989; 422,210, filed 16 Oct. 1989; 422,354, filed 16 Oct. 1989; 422,487, filed 16 Oct. 1989; 426,921, filed 24 Oct. 1989; and 451,659 filed 15 Dec. 1989, all cofiled or copending with the present application, and all assigned to Allied-Signal Inc.

The present invention relates generally to valve apparatus and methods. More particularly, the present invention relates to butterfly valve apparatus and methods wherein a duct defines a flow path for conveying a flow of fluid. A plate-like valve member is pivotally disposed in the duct about a transverse axis, and is conformal at its outer periphery to the internal wall shape of the duct. The valve member is pivotal between a first position transverse to the flow path and substantially sealingly engaging the duct wall to close fluid flow therein, and a second position spanning the flow path generally parallel therewith to allow and control the fluid flow therein.

A conventional butterfly valve is set forth, by U.S. Pat. No. 3,971,414, issued 27 Jul. 1976 to H. Illing. The '414 patent also discusses the general state of the butterfly valve art prior to the invention by Illing. According to the teaching of the '414 patent, the actuating torque required to rotate the valve member of a butterfly valve from its closed position to an open position may be reduced by utilizing an articulated valve member. That is, the plate like butterfly valve member includes a leading wing and a trailing wing with respect to fluid flow. The leading wing of Illing's valve member is defined in part by a servo or spoiler tab which is carried by and pivotally movable relative to the remainder of the valve member. By pivoting the spoiler tab ahead of the valve member in the opening direction so as to point into the fluid flow Illing changes the angulation and effective moment arm of the fluid pressure and flow forces on the spoiler tab. Illing hopes to reduce the total torque opposing opening of the valve member in comparison to prevoiusly known butterfly valves. The articulation of the spoiler tab is such that it pivots from an aligned position to move ahead of the valve member during most of the pivotal movement of the latter in the opening direction. During the last portion of the pivotal movement of the valve member to its fully open position, the servo tab reverses its relative pivotal movement and returns to an aligned position achieved when the valve member is fully open. In this way, the valve member and servo tab align with one another and with the fluid flow in the fully open position of the valve member.

A reduction in the operating torque required to move the valve member from its closed to its open position, such as assertedly achieved by the invention of Illing, has been a long-recognized need in the field of butterfly valves. Unfortunately, the invention of Illing as set forth in the '414 patent does not fully comprehend the usual design requirements for a butterfly valve, and has not enjoyed commercial acceptance, to the Applicant's knowledge.

It will be understood by those skilled in the pertinent art that the valve member of a coinventional butterfly valve must ordinarily achieve a sealing tight fit with the walls of the duct. Ordinarily the plate-like butterfly valve member carries a seal member at the outer periphery thereof. This seal member, for example, a piston ring type, O-ring, or lip seal, is resiliently and sealingly engageable with the duct wall in the closed position of the valve member. Thus, it is conventional for the plate-like valve member to be circumferentially continuous, and to be skewed slightly relative to the pivot shaft supporting the valve member. That is, the periphery of the valve member is disposed upstream of the shaft on one side and downstream of the shaft on the other to allow use of a circumferentially continuous sealing member at the periphery of the valve member. The pivot shaft may transect the duct perpendicularly to the flow path, or be angulated relative to the latter. The valve taught by the '414 patent does not permit use of a circumferentially continuous sealing member on the valve member periphery.

In view of the deficiencies of the known butterfly valve art it is an object for this invention to reduce or eliminate the opposing torque which must be overcome to move the valve member of a butterfly valve from its closed to its open position.

Desirably, fluid pressure and flow forces acting on the plate-like butterfly valve member may be used to reduce or eliminate the opposing torque, or to effect pivotal movement of the valve member.

Still further, in view of the deficiencies of the valve taught by Illing in the '414 patent, a circumferentially cotinuous sealing member must be possible of use on the valve member.

Accordingly the present invention provides a duct for conveying a flow of fluid therein, a plate-like butterfly valve member freely pivotal about a transverse axis substantially bisecting said duct between a first position transverse to and closing said duct and a second position non-transverse or substantially parallel with said duct to open fluid flow therein, said transverse pivot axis dividing said valve member into a pair of opposite butterfly valve member wings of substantially equal area, an upstream one of said pair of valve member wings with respect to pivotal movement of the latter from said first to said second position defining an aperture therethrough, valve means opening and closing said aperture in response to an actuation input, and actuator means carried upon said valve member for providing said actuation input to said valve means.

An advantage of the present invention is that it allows use of a circumferentially continuous sealing member on the plate-like valve member of the butterfly valve.

Another advantage of the present invention is the complete elimination of an externally mounted actuator. That is, a conventional valve actuator possibly mounted to the duct and providing torque to the plate-like valve member relative to the duct is not required with the present invention.

FIG. 1 depicts a longitudinal, and partially cross-sectional schematic view taken along lines 1—1 of FIG. 2, of a valve apparatus according to a preferred embodiment of the invention:

FIG. 2 is a cross-sectional view taken along line 2—2 of FIG. 1:

Figure 3:
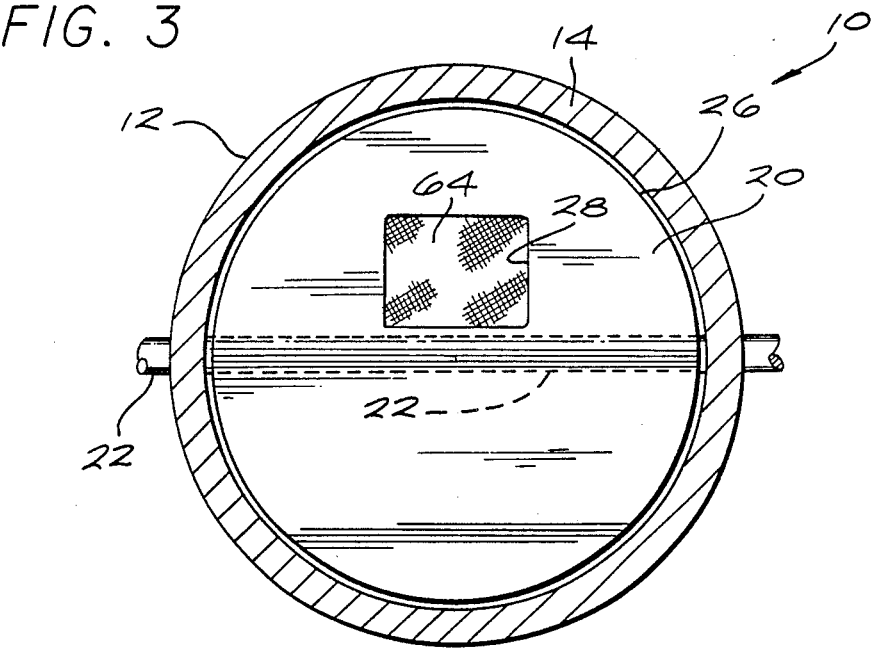
FIG. 3 is a cross-sectional view taken along line 3—3 of FIG. 1.

Viewing FIGS. 1, 2, and 3 in conjunction, it will be seen that a butterfly valve, or valve device 10, includes a duct 12 having an elongate and circumferentially extending wall 14. The wall 14 bounds a flow path 16 wherein is conveyed a flow of fluid, as is depicted by arrow 18. A plate-like butterfly valve member 20 is freely pivotally disposed in the duct 12. In order to journal the valve member 20, the latter includes a shaft portion 22 which at one end is pivotally received into a recess of the wall 14 (not visible in the drawing Figures), and at the opposite end sealingly extends outwardly through a bore 24 defined by wall 14.

Those skilled in the butterfly valve art will recognize that the valve member 20 may conventionally include a circumferentially extending sealing member (not shown) carried at an outer peripheral surface 26 of the valve member. This sealing member may be, for example, a piston ring type, an O-ring, or a lip seal type. Also, the valve member 20 and shaft 22 may be skewed so that the shaft lies downstream of the valve member at one side and upstream at the opposite side. This feature allows the sealing member to be circumferentially continuous and avoids interruption of the sealing member by the shaft portion 22. However, in order to simplify depiction of the present invention, these conventional design expedients of the butterfly valve art are not included by the schematic drawing Figures.

The valve member 20 defines a rectangular through aperture 28 in a leading wing 30 thereof. On the trailing wing 32 of the valve member 20, an actuator 34 is disposed. Viewing FIG. 2 particularly, it will be seen that the actuator 34 includes a housing 36 defining a bore 38 therein. A piston member 40 having a head portion 42 and rod portion 44 is sealingly and reciprocably received in the bore 38. The piston member 40 cooperates with housing 36 to define a pair of variable-volume cavities 46, 48 which expand and contract in opposition as the piston member reciprocates. One of the cavities, 48, receives a coil compression spring 50 urging the piston member 40 upwardly to a first position, as depicted in FIG. 1. The cavity 48 is also vented to the flow path 16 by a vent passage 52 defined by housing 36. A passage 54 extends from chamber 46 through the housing 36 and valve member 20 including shaft portion 22 to open outwardly of the butterfly valve device 10. A flexible conduit 56 connects to shaft portion 22 externally of the duct 12 and to passage 54 thereof to communicate pressurized fluid in and out of cavity 46, as is indicated by arrow 58.

In order to control fluid flow through the aperture 28, a rolling valve mechanism, generally designated with the numeral 60 is carried by the valve member 20. The valve mechanism 60 includes a roller member 62 about which a valve web 64 is receivable. On each side of the valve web 64, one of a pair of guide webs 66, 68 is wrapped on the roller member 62. The valve web 64 and pair of guide webs 66, 68 are wrapped about roller member 62 in opposite directions and secured thereto at inner ends. Each of the webs 64, 66, and 68 is secured to the valve member 20 at respective outer ends 70, 72, and 74 thereof. A clevis member 76 is carried at a distal end of rod portion 44 and rotatably engages the roller member 62 at each end of the latter by means of axle pins 78, only one of which is visible in the Figures.

Having considered the structure of the butterfly valve 10, attention may now be given to its operation. As depicted in FIG. 1, the valve member 20 in its first or closed position spans the flow path 16 to substantially prevent fluid flow therein. Because the leading wing 30 and trailing wing 32 of the valve member define substantially equal areas on opposite sides of the shaft 22, the fluid pressure forces on the valve member 20 are balanced. In fact, the balance of forces on a butterfly valve member are such that the valve member will seek its closed position in response to fluid static pressure forces. In the closed position of the butterfly valve member 20, the valve web 64 spans and closes the aperture 28.

In order to open the valve member 20, a fluid pressure is provided to cavity 46 via the flexible conduit 56 and passage 54, recalling arrow 58. This fluid pressure initially must be sufficient to overcome both the static preload of spring 50 and the static fluid pressure in duct 12 upstream of valve member 20. However, application of sufficient fluid pressure to cavity 46 results in downward movement of piston member 40 and clevis 76 viewing the drawing Figures. Consequently, the roller member 62 rolls downwardly along valve member 20, rolling up the valve web 64 as it unrolls the two guide webs 66, 68.

Figure 4:
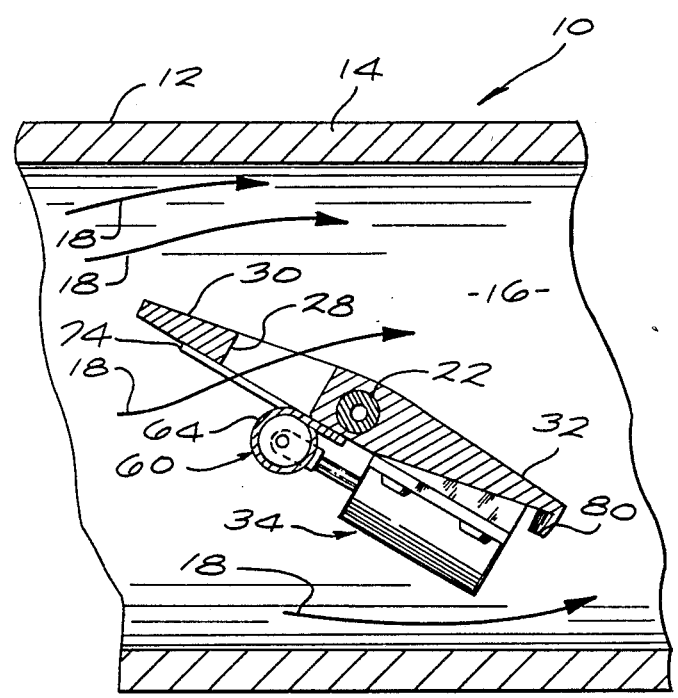
FIG. 4 is a longitudinal partially cross-sectional view similar to FIG. 1, but showing parts of the valve apparatus in alternative operative positions.

As the valve web 64 is rolled up on roller member 62, it progressively uncovers the aperture 28 to allow fluid flow therethrough. Also, the balance of static pressure forces on valve member 20 is changed as the aperture 28 is progressively uncovered. That is, the effective area of the leading wing 30 is decreased while the trailing wing 30 remains of constant area. The result is a moment effective on the valve member 20 to pivot the latter counter clockwise from its position of FIG. 1 and toward a second or open position, as depicted in FIG. 4.

Consequent to opening of the valve member 20, fluid flows in the flow path 16 so that the freely pivotal valve member 20 responds not only to static fluid pressure forces, but also to fluid flow forces. As seen in FIG. 4, the valve member 20 may be considered somewhat like a weather vane pivoting toward or away from the oncoming fluid flow in response to the balance of moments effective thereon. It is easily appreciated that the fluid flow forces on leading wing 30 create a clockwise moment tending to close the valve member 20. The effective area of the leading wing 30 is controllable by the position of roller valve mechanism 60 and the degree to which aperture 28 is uncovered or obstructed. On the other hand, the fluid flow forces on trailing wing 32 tend to produce a counter clockwise movement toward opening of valve member 20. This opening movement is assisted by fluid drag effective on the housing 36 of the actuator 34, and also by an arcuate drag fence 80 disposed near the outer periphery of wing 32. That is, the housing 36, and fence 80 combine to provide a fluid dynamic drag on the trailing wing 32. This fluid dynamic drag on trailing wing 32 causes valve member 20 to act much like a weather vane turning into the oncoming fluid flow.

To recap the above, the angular position of the freely pivotal valve member 20, and, therefore, the fluid flow allowed in duct 12, is controlled by application of fluid pressure to cavity 46. Expansion and contraction of cavity 46 causes extension and retraction of piston member 44, carrying the clevis 76 and roller member 62 in translation. As the roller member 62 is translated across the face of valve member 20 it rolls up one of the valve web 64 or pair of guide webs 66, 68, while unrolling the other. Rolling up or unrolling of valve web 64 exposes or obstructs aperture 28 in leading wing 30. For each increment of opening of aperture 28 there is a corresponding angular position of valve member 20 determined by the balance of fluid dynamic moments effective thereon. Closing of the aperture 28 in response to the relief of fluid pressure from cavity 46 results in the valve member 20 returning to its position of FIG. 1, which is a stable position blocking the flow path 16 in response to static fluid pressure forces.

What is claimed is:

1. Valve apparatus comprising: a duct for conveying a flow of fluid therein, a plate-like butterfly valve member freely pivotal about a transverse axis substantially bisecting said duct between a first position transverse to and closing said duct and a second position non-transverse or substantially parallel with said duct to open fluid flow therein, said transverse pivot axis dividing said valve member into a pair of opposite butterfly valve member wings of substantially equal area, an upstream one of said pair of valve member wings with respect to pivotal movement of the latter from said first to said second position defining an aperture therethrough, valve means opening and closing said aperture in response, to an actuation input, and actuator means including a motor carried upon said valve member for providing said actuation input to said valve means.

2. Valve apparatus comprising: a duct for conveying a flow of fluid therein, a plate-like butterfly valve member freely pivotal about a transverse axis substantially bisecting said duct between a first position transverse to and closing said duct and a second position non-transverse or substantially parallel with said duct to open fluid flow therein, said transverse pivot axis dividing said valve member into a pair of opposite butterfly valve member wings of substantially equal area, an upstream one of said pair of valve member wings with respect to pivotal movement of the latter from said first to said second position defining an aperture therethrough, valve means opening and closing said aperture in response to an actuation input, and actuator means carried upon said valve member for providing said actuation input to said valve means, wherein a downstream one of said pair of butterfly valve member wings carries fluid flow drag means for increasing the "weathervane" effect on said valve member in said second position thereof.

3. The invention of claim 2 wherein said drag means includes said actuator means.

4. The invention of claim 2 wherein said drag means includes a fence member carried proximate to the outer perimeter of said valve member on an upstream face thereof and extending generally perpendicularly therefrom.

5. Valve apparatus comprising: a duct for conveying a flow of fluid therein, a plate-like butterfly valve member freely pivotal about a transverse axis substantially bisecting said duct between a first position transverse to and closing said duct and a second position non-transverse or substantially parallel with said duct to open fluid flow therein, said transverse pivot axis dividing said valve member into a pair of opposite butterfly valve member wings of substantially equal area, an upstream one of said pair of valve member wings with respect to pivotal movement of the latter from said first to said. second position defining an aperture therethrough, valve means opening and closing said aperture in response to an actuation input, and actuator means carried upon said valve member for providing said actuation input to said valve means, wherein said valve means comprises a circularly cylindrical roller member, an elongate flexible valve member securing at one end thereof to said roller member, said flexible valve member at least partially wrapping about said cylindrical member to extend from said cylindrical member adjacent a face of said butterfly valve member and securing at an opposite end thereof to said butterfly valve member adjacent a first edge of said aperture, and means for guiding said cylindrical member in rolling traverse across said aperture.

6. The invention of claim 5 wherein said guiding means includes a pair of elongate flexible guide members spaced on opposite sides of said flexible valve member and each securing at a respective end thereof to said cylindrical member, each one of said pair of guide members at least partially wrapping about said cylindrical member in a wrap direction opposite to that of said flexible valve member and extending from said cylindrical member adjacent said face of said butterfly valve member in a direction opposite to the extension of said flexible valve member and securing to said butterfly valve member along a line adjacent a second edge of said aperture which is opposite to said first edge thereof.

7. The invention of claim 6 wherein said guide means further includes said actuator means.

8. Valve apparatus comprising: a duct for conveying a flow of fluid therein, a plate-like butterfly valve member freely pivotal about a transverse axis substantially bisecting said duct between a first position transverse to and closing said duct and a second position non-transverse or substantially parallel with said duct to open fluid flow therein, said transverse pivot axis dividing said valve member into a pair of opposite butterfly valve member wings of substantially equal area, an upstream one of said pair of valve member wings with respect to pivotal movement of the latter from said first to said second position defining an aperture therethrough, valve means opening and closing said aperture in response to an actuation input, and actuator means carried upon said valve means, wherein said actuator means includes a piston and cylinder cooperatively defining a variable-volume chamber expanding and contracting in response to receipt and venting of pressurized fluid therein to effect said actuation input to said valve means.

9. The invention of claim 8 wherein said duct journals a freely rotatable shaft member carrying said butterfly valve member and defining said transverse pivot axis therefore, said shaft member defining a passage conveying pressurized fluid to said variable-volume chamber of said actuator means.

10. Butterfly valve structure comprising:
 a duct member including a circumferential wall defining an axially extending fluid flow path;
 a shaft member supporting upon said duct member wall and transversely bisecting said fluid flow path substantially perpendicularly thereto;
 a plate-like butterfly valve member carried upon said shaft in said fluid flow path for free pivotal movement between a first position transverse to and closing said flow path and a second position wherein said plate-like valve member is non-transverse or substantially parallel with said flow path, said plate-like butterfly valve member including a pair of valve member wings disposed on opposite sides of said shaft member and of substantially equal area, an upstream one of said pair of wings with respect to pivotal movement of said butterfly valve member from said first position to said second position defining an aperture therethrough;

a pilot valve carried upon said butterfly valve member and movable relative thereto in response to an actuation input for opening and closing said aperture, and actuation means carried upon said butterfly valve member for providing said actuation input to said pilot valve means, wherein said pilot valve comprises an elongate roller member movable to traverse said aperture at the opening thereof upon a face of said butterfly valve member, said roller member carrying an elongate flexible pilot valve member securing both to said butterfly valve member and to said roller member, and said flexible pilot valve member rolling up and unrolling upon said face of said butterfly valve member in response to respectively opposite directions of traverse of said roller member across said aperture, said elongate flexible pilot valve member spanning and closing said aperture according to the position of said roller member in traverse across said aperture.

11. The invention of claim 10 further including said roller member carrying an elongate flexible guide member securing both to said butterfly valve member and to said roller member and rolling up and unrolling from said roller member in opposition to said flexible valve member.

12. The invention of claim 11 wherein said elongate flexible valve member is disposed centrally of the length of said roller member, said roller member carrying a guide member disposed on each opposite side of said elongate flexible valve member and proximate to opposite ends of said roller member.

13. The invention of claim 10 wherein said actuation means comprises housing carried by said butterfly valve member and defining an actuator bore therein, a piston member reciprocably and sealingly received in said bore, said housing and said piston cooperating to define a variable-volume chamber, a piston rod member drivingly connecting said piston with said pilot valve means for providing said actuation input thereto in response to reciprocation of said piston member.

14. The invention of claim 13 further including said shaft member defining a passage communicating pressurized fluid from a source thereof to said variable-volume chamber.

15. The invention of claim 13 further including resilient means yieldably urging said actuation means to a first position wherein said pilot valve closes aperture.

16. The invention of claim 10 additionally including a drag fence disposed on a downstream one of said valve member wings on an upstream face thereof.

17. The method of stopping and throttlingly controlling a flow of pressurized fluid, said method comprising the steps of:
conveying said fluid flow through a duct;
disposing a plate-like butterfly valve member in said duct for free pivotal movement about a transverse axis substantially bisecting said duct between a first position transverse to and closing said duct and a second position non-transverse or substantially parallel with said duct to open said fluid flow therein;
providing an aperture through said butterfly valve member in one of a pair of wings thereof which are on opposite sides of said pivot axis and substantially of equal area;
opening and closing said aperture with a pilot valve member carried upon said butterfly valve member:
using an actuator including a motor to move said pilot valve to open and close said aperture, and
carrying said actuator and motor upon said butterfly valve member.

18. The method of claim 17 further including the step of using of a piston-and-cylinder pressure responsive motor.

19. The method of stopping and throttlingly controlling a flow of pressurized fluid, said method comprising the steps of:
conveying said fluid flow through a duct;
disposing a plate-like butterfly valve member in said duct for free pivotal movement about a transverse axis substantially bisecting said duct between a first position transverse to and closing said duct and a second position non-transverse or substantially parallel with said duct to open said fluid flow therein;
providing an aperture through said butterfly valve member in one of a pair of wings thereof which are on opposite sides of said pivot axis and substantially of equal area;
opening and closing said aperture with a pilot valve member carried upon said butterfly valve member;
using an actuator to move said pilot valve to open and close said aperture;
carrying said actuator upon said butterfly valve member;
further including the steps of: utilizing as said pilot valve member an elongate flexible member at one end thereof securing to a face of said butterfly valve member adjacent said aperture, spanning said flexible member across said aperture to close the latter, providing a circularly cylindrical roll member, securing the opposite end of said elongated flexible member to said roll member, traversing said roll member across said aperture, and rolling up or unrolling said elongate flexible member onto or from said roll member in response to said traversing of the latter across said aperture to respectively progressively open and close said aperture.

* * * * *